United States Patent
Nagaishi et al.

(10) Patent No.: US 6,851,411 B2
(45) Date of Patent: Feb. 8, 2005

(54) KNOCKING INDEX VALUE CALCULATION DEVICE AND CALCULATION METHOD THEREOF

(75) Inventors: Hatsuo Nagaishi, Yokohama (JP); Takashi Nakazawa, Kawasaki (JP); Takeshi Etou, Chigasaki (JP); Takahisa Koseki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 31 days.

(21) Appl. No.: 10/756,353

(22) Filed: Jan. 14, 2004

(65) Prior Publication Data

US 2004/0159309 A1 Aug. 19, 2004

(30) Foreign Application Priority Data

Feb. 17, 2003 (JP) ........................................ 2003-038018

(51) Int. Cl.[7] ................................................ F02P 5/14
(52) U.S. Cl. ............................ 123/406.34; 123/406.22; 123/406.55
(58) Field of Search ........................ 123/406.22, 406.26, 123/406.34, 406.4, 406.41, 406.55

(56) References Cited

U.S. PATENT DOCUMENTS 6,574,961 B2 * 6/2003 Shiraishi et al. ............... 60/602

FOREIGN PATENT DOCUMENTS

| JP | 136528 | * | 5/1990 | ........... F02D/41/04 |
| JP | 92741 | * | 4/1991 | ........... G01L/23/22 |
| JP | 10-30535 A | | 2/1998 | |
| JP | 169536 | * | 6/1998 | ............. F02P/5/15 |
| JP | 2001/221105 A | | 8/2001 | |
| JP | 44543 | * | 2/2004 | ............ F02P/5/152 |

* cited by examiner

*Primary Examiner*—Hai Huynh
(74) *Attorney, Agent, or Firm*—Foley & Lardner LLP

(57) ABSTRACT

A controller (31) of a knocking index value calculation device in a spark ignition engine (1) determines operating conditions of the engine (1), estimates an in-cylinder pressure at a reference crank angle, which is set at a predetermined crank position after compression top dead center, using these operating conditions, estimates a temperature of unburned gas in the cylinder at the reference crank angle using these operating conditions, and calculates a knocking index value using the in-cylinder pressure and unburned gas temperature.

9 Claims, 12 Drawing Sheets

COMPUTATION OF MAIN COMBUSTION PERIOD BURN2

US 6,851,411 B2

KNOCKING INDEX VALUE CALCULATION DEVICE AND CALCULATION METHOD THEREOF

TECHNICAL FIELD OF THE INVENTION

This invention relates to a calculation device which is suitable for use in ignition timing control and the like in a spark ignition engine, and more particularly to a device for calculating an index value which serves as an indication of knocking occurrence.

BACKGROUND OF THE INVENTION

JP10-30535A, published by the Japan Patent Office in 1998, discloses ignition timing control in a spark ignition engine performed in consideration of knocking. In this prior art, the ignition timing in the vicinity of the knocking limit (the trace knock point) is determined experientially for each model, mapped, and then read by a control unit in order to perform ignition timing control.

SUMMARY OF THE INVENTION

In the prior art described above, when creating an ignition timing map, it is difficult to measure conditions such as the air temperature, air pressure, humidity, engine temperature, fuel octane value, and so on with stability, and hence adjustment of these conditions and sensitivity correction in relation thereto are performed. As a result, the number of steps required for map plotting greatly increases, and a large amount of time is required for matching the map to the engine. Further, the likelihood of knocking varies according to specifications such as the shape, dimensions, materials, and so on of the engine components, and hence this matching operation which requires a large number of steps must be performed anew upon each variation.

It is therefore an object of this invention to reduce the number of matching steps in an ignition timing control device or the like, and to reduce the calculation load in a control system thereof.

In order to achieve above object, the present invention provides a knocking index value calculation device of a spark ignition engine comprising a controller functioning to determine operating conditions of the engine; estimate an in-cylinder pressure at a reference crank angle, which is set at a predetermined crank position after compression top dead center, on the basis of the operating conditions; estimate a temperature of unburned gas in the cylinder at the reference crank angle on the basis of the operating conditions; and calculate a knocking index value using the in-cylinder pressure and unburned gas temperature.

The details as well as other features and advantages of this invention are set forth in the remainder of the specification and are shown in the accompanying drawings.

DESCRIPTION OF THE PREFERRED EMBODIMENTS

Figure 1:
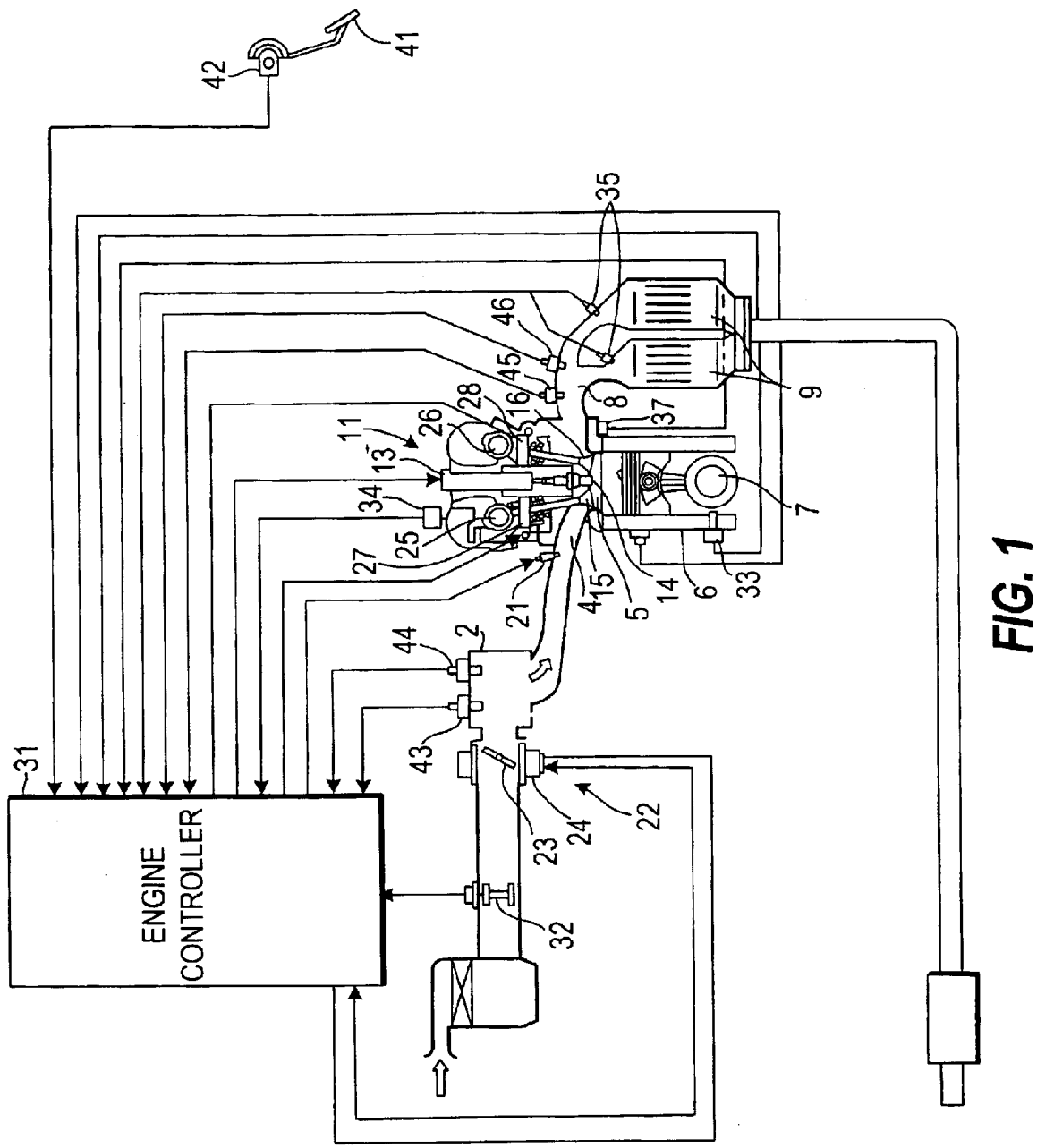
FIG. 1 is a control system diagram of an engine according to an embodiment of this invention.

FIG. 1 is a schematic diagram for illustrating the system of this invention.

Air is accumulated in an intake air collector 2, whereupon the air is led into a combustion chamber 5 of each cylinder through an intake manifold 3. Fuel is supplied by injection from a fuel injector 21 disposed on an intake port 4 of each cylinder. Having been injected into the air, the fuel gasifies while mixing with the air, thereby producing a gas (air-fuel mixture) which flows into the combustion chamber 5. The air-fuel mixture is sealed into the combustion chamber 5 when an intake valve 15 is closed, and compressed when a piston 6 rises.

In order to perform ignition of the compressed air-fuel mixture by means of a spark, an ignition device 11 of an electronic distribution system, in which an ignition coil built into a power transistor is disposed in each cylinder, is provided. The ignition device 11 is constituted by an ignition coil 13 for storing electrical energy from a battery, a power transistor for energizing and disconnecting a primary side of the ignition coil 13, and a spark plug 14 provided on the ceiling of the combustion chamber 5 for receiving a high voltage generated on a secondary side of the ignition coil 13 when the primary electrical current of the ignition coil 13 is blocked so as to perform spark discharge.

Slightly before compression top dead center, a spark is blown by the spark plug 14 and the compressed air-fuel mixture is ignited. As the flame propagates, the air-fuel mixture begins to burn rapidly, and this combustion causes the gas pressure to push the piston 6 downward. This downward pushing is outputted as the rotary power of a crankshaft 7. The gas following combustion (exhaust gas) is discharged to an exhaust passage 8 when an exhaust valve 16 is opened.

A three way catalyst 9 is provided in the exhaust passage 8. When the air-fuel ratio of the exhaust gas is within a narrow range centered on a stoichiometric air-fuel ratio, the three way catalyst 9 is capable of efficiently removing HC, CO, and NOx contained in the exhaust gas simultaneously. The air-fuel ratio is the ratio of the amount of intake air and the amount of fuel, and hence a fuel injection amount from the fuel injector 21 is determined by an engine controller 31 on the basis of an intake air flow signal from an air flow meter 32 and signals from crank angle sensors 33, 34 such that the ratio of the intake air amount introduced into the combustion chamber 5 and the fuel injection amount from the fuel injector 21 reaches the stoichiometric air-fuel ratio at each cycle of the engine (at 720-degree crank angle intervals in a four-cycle engine). The engine controller 31 also feedback-controls the air-fuel ratio based on a signal from an $O_2$ sensor 35 provided upstream of the three way catalyst 9.

An electronic control throttle 22 having a throttle valve 23 which is driven by a throttle motor 24 is provided upstream of the intake air collector 2. The torque desired by the driver is realized as the depression amount of an accelerator pedal 41, and hence the engine controller 31 determines a target torque on the basis of a signal from the accelerator pedal 42, determines a target air amount for realizing the target torque, and controls the opening of the throttle valve 23 via the throttle motor 24 such that the target air amount is obtained.

A cam sprocket and a crank sprocket are attached respectively to the front portions of an intake valve camshaft 25, an exhaust valve camshaft 26, and the crankshaft 7. By hanging a timing chain around these sprockets, the camshafts 25, 26 are driven by the crankshaft 7 of the engine. An intake valve timing control mechanism (to be referred to as an intake VTC mechanism below) 27 capable of continuously controlling the phase of the intake valve cam at a constant operating angle is provided between the cam sprocket and the intake valve camshaft 25, and an exhaust valve timing control mechanism (to be referred to as an exhaust VTC mechanism below) 28 capable of continuously controlling the phase of the exhaust valve cam at a constant operating angle is provided between the cam sprocket and the exhaust valve camshaft 26. When the open/close timing of the intake valve 15 and the open/close timing of the exhaust valve 16 are varied, the amount of inert gas remaining in the combustion chamber 5 varies. Depending on the operating conditions, pumping loss decreases and fuel economy improves as the amount of inert gas inside the combustion chamber 5 increases, and hence the amount of inert gas to be left in the combustion chamber 5 is determined in advance according to the operating conditions as a target intake valve closing timing and a target exhaust valve closing timing. The engine controller 31 then determines a target intake valve closing timing and target exhaust valve closing timing according to the operating conditions (engine load and rotation speed) at that time, and controls the intake valve closing timing and exhaust valve closing timing via actuators of the intake VTC mechanism 27 and exhaust VTC mechanism 28 such that these target values are obtained.

An intake air temperature signal from an intake air temperature sensor 43, an intake air pressure signal from an intake air pressure sensor 44, an exhaust gas temperature signal from an exhaust gas temperature sensor 45, and an exhaust gas pressure signal from an exhaust gas pressure sensor 46 are inputted into the engine controller 31 together with a cooling water temperature signal from a water temperature sensor 37. The engine controller 31 then controls the ignition timing, which is the timing for blocking the primary side current of the spark plug 14, via the power transistor 13.

Figure 2:
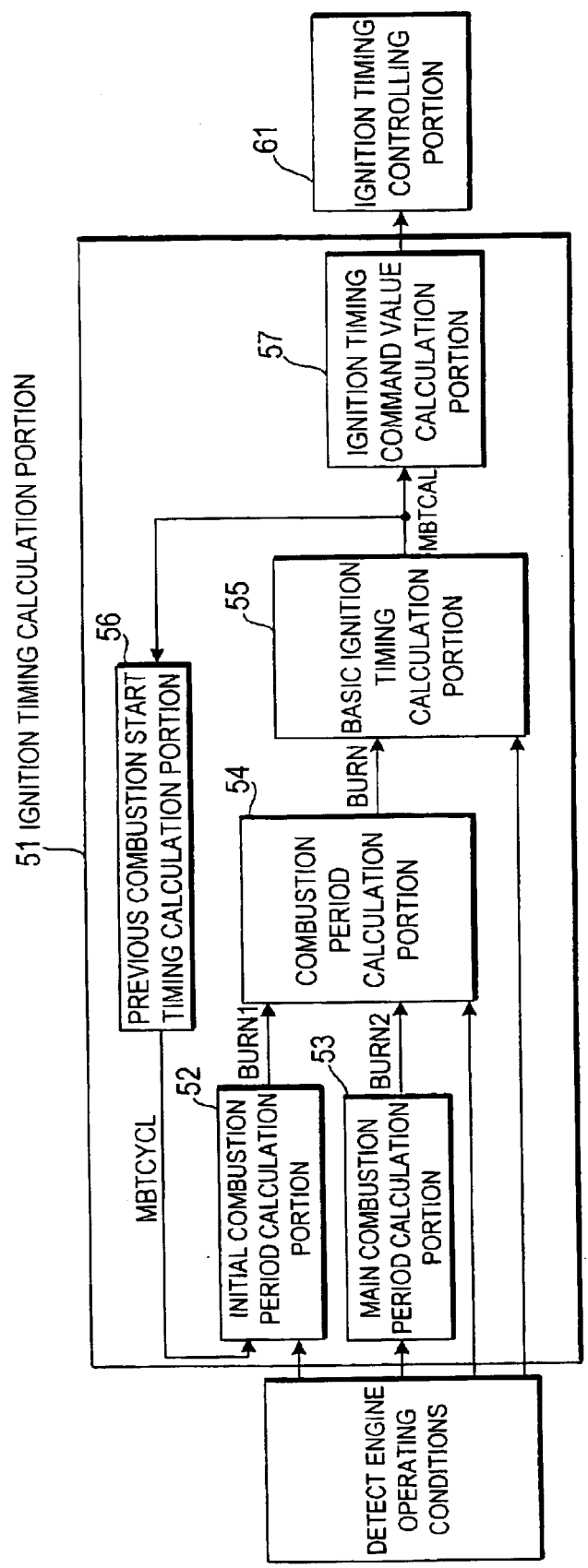
FIG. 2 is a block diagram of ignition timing control executed by an engine controller.

FIG. 2 is a block diagram of the ignition timing control performed in the engine controller 31, and mainly shows in detail the part for determining an ignition timing MBTCAL at which MBT (the minimum advance value for obtaining maximum torque) is obtained. This system is largely constituted by an ignition timing calculation portion 51 and an ignition timing control portion 61. The ignition timing calculation portion 51 is further constituted by an initial combustion period calculation portion 52, a main combustion period calculation portion 53, a combustion period calculation portion 54, a basic ignition timing calculation portion 55, a previous combustion start timing calculation portion 56, and an ignition timing command value calculation portion 57.

In the initial combustion period calculation portion 52, a period from ignition of the air-fuel mixture to formation of a flame kernel is calculated as an initial combustion period BURN1. In the main combustion period calculation portion 53, a period from formation of the flame kernel to attainment of a maximum combustion pressure value Pmax is calculated as a main combustion period BURN2. In the combustion period calculation portion 54, the sum total of the initial combustion period BURN1 and the main combustion period BURN2 is calculated as a combustion period BURN from ignition to attainment of the maximum combustion pressure Pmax. In the basic ignition timing calculation portion 55, the ignition timing MBTCAL at which MBT is obtained (this ignition timing will be referred to as the basic ignition timing) is calculated on the basis of the combustion period BURN.

In the ignition timing command value calculation portion 57, MBTCAL is compared with a knock limit ignition timing KNKCAL determined by a method according to this invention that will be described below, and the smaller value (the later ignition timing) is selected as a minimum ignition timing value PADV. The minimum ignition tuning value PADV is subjected to various corrections to calculate an ignition timing command value QADV which is output to the ignition timing control portion 61.

In the ignition timing control portion 61, the angle of energization and angle of non-energization to the ignition coil 13 are controlled such that the spark plug 14 ignites the air-fuel mixture inside the combustion chamber 5 according to the ignition timing command value QADV determined in the manner described above.

Calculation methods of the basic ignition timing MBTCAL described above, and the knock limit ignition timing KNKCAL will be described in further detail below.

Figure 3:
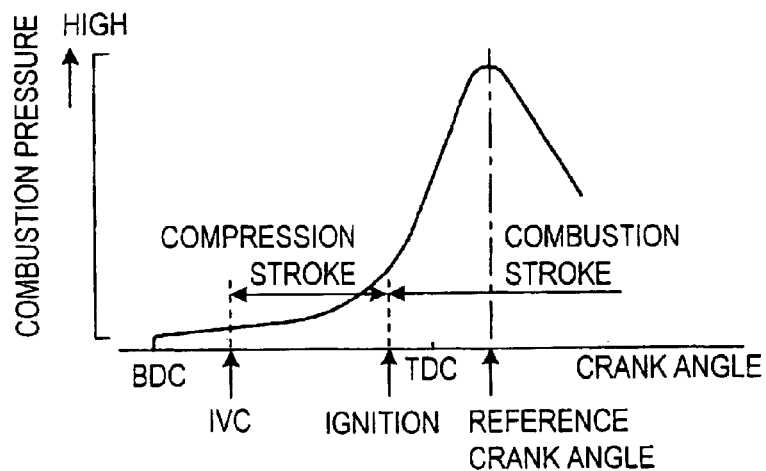
FIG. 3 is a diagram showing variation in the pressure of a combustion chamber.

As shown in FIG. 3, the crank angle at which the combustion pressure of the air-fuel mixture reaches the maximum value Pmax when the air-fuel mixture is ignited at MBT (the minimum advance value for obtaining maximum torque) is set as a reference crank angle θPMAX([deg ATDC]. The reference crank angle θPMAX is substantially constant regardless of the combustion system, and is within a typical range of 12–15 degrees and a maximum range of 10–20 degrees.

Figure 4:
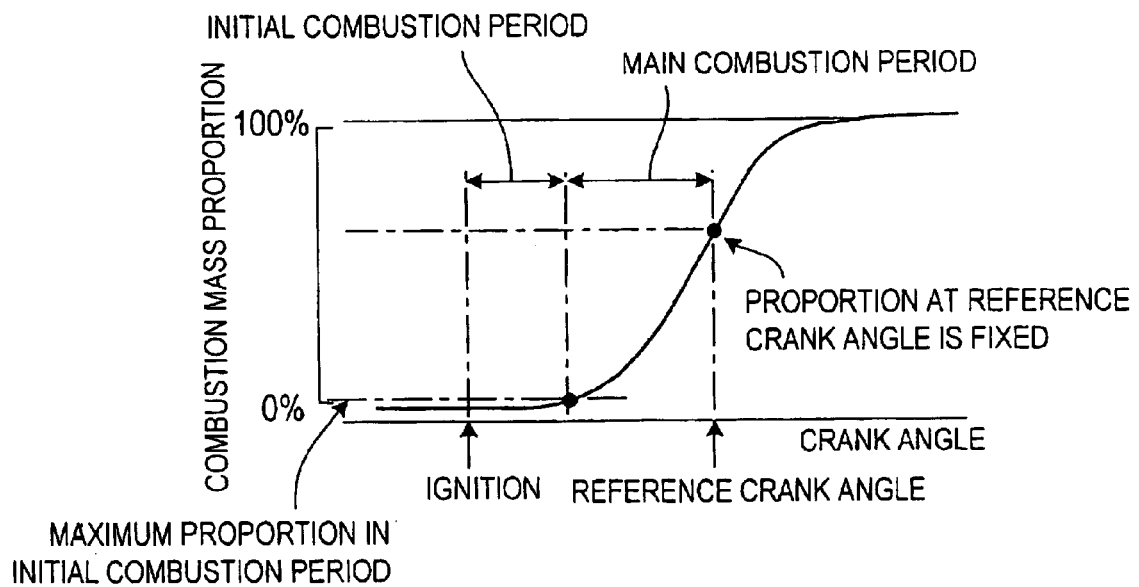
FIG. 4 is a characteristic diagram illustrating variation in the combustion mass proportion.

FIG. 4 shows variation in a combustion mass proportion R obtained by analyzing combustion in the combustion chamber of a spark ignition engine. The combustion mass proportion R, which expresses the ratio of combustion mass to the fuel supplied to the combustion chamber, is zero percent at the time of ignition, and reaches one hundred percent upon complete combustion. A combustion mass proportion Rmax at the reference crank angle θPMAX is fixed at approximately sixty percent.

The combustion period from when the combustion mass proportion R is zero percent to when the combustion mass proportion reaches approximately 60% at the reference crank angle θPMAX is divided into an initial combustion period, which is the period immediately after ignition when there is substantially no change in either the combustion mass proportion or the combustion pressure, and a main combustion period, during which the combustion mass proportion and combustion pressure increase rapidly. The initial combustion period is the stage from the beginning of combustion to formation of a flame kernel, the flame kernel being formed at a timing when the combustion mass proportion is between two percent and ten percent. During this period, the increase rate of the combustion pressure and combustion temperature is low, and thus the initial combustion period is long in relation to change in the combustion mass proportion. The length of the initial combustion period is easily affected by variation in the temperature and pressure inside the combustion chamber.

In the main combustion period, on the other hand, the flame propagates from the flame kernel to an outside laminar flow region, and the combustion rate increases rapidly. Hence change in the combustion mass proportion during the main combustion period is greater than change in the combustion mass proportion during the initial combustion period.

In the engine controller 31, the period until the combustion mass proportion reaches two percent is classified as the initial combustion period BURN1 [deg], and the period from the end of the initial combustion period BURN1 until the reference crank angle θPMAX is reached (in terms of the combustion mass proportion, from two percent to approximately sixty percent) is classified as the main combustion period BURN2 [deg]. The combustion period BURN [deg], which is the sum total obtained by adding the main combustion period BURN2 to the initial combustion period BURN1, is then calculated, whereupon the reference crank angle θPMAX [deg ATDC] is subtracted from the combustion period BURN, and a crank angle position to which a crank angle IGNDEAD [deg] corresponding to an ignition timing dead time, to be described below, has been added is set as the basic ignition timing MBTCAL [deg BTDC], which is the ignition timing at which MBT is obtained.

The pressure and temperature inside the combustion chamber 5 during the initial combustion period in which the flame kernel is formed are substantially identical to the pressure and temperature at the time of ignition, but when an ignition timing is to be calculated, it is impossible to set an accurate ignition timing initially. Hence, as shown in FIG. 2, a previous basic ignition timing value is calculated by the previous combustion start timing calculation portion 56 as a previous combustion start timing MBTCYCL [deg BTDC], and this value is provided to the initial combustion period calculation portion 52. Then, in the initial combustion period calculation portion 52, calculation of the initial combustion period is repeated, whereby a precise result is outputted with no time delay.

Next, calculation of the ignition timing command value QADV, which is executed by the engine controller 31, will be described in detail with reference to the following flowcharts.

Figure 5:
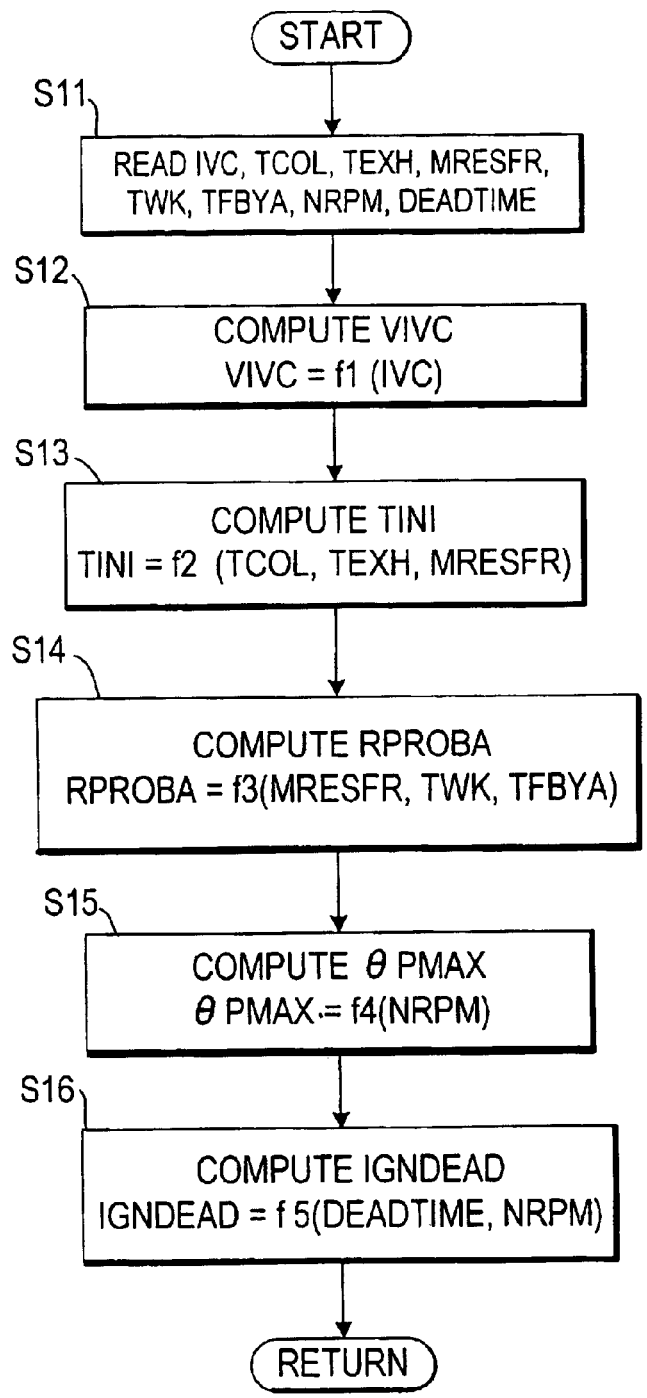
FIG. 5 is a flowchart for illustrating the calculation of physical quantity values.

FIG. 5 shows a flow for calculating various physical quantity values required in the calculation of the ignition timing. It should be noted that the flowcharts used in the following description, including FIG. 5, illustrate calculation processing sequences that are executed repeatedly by the controller 31 in cycles of approximately 10 msec, for example.

First, in a step S11, an intake valve closing timing IVC [deg BTDC], a temperature TCOL [K] inside the collector detected by the temperature sensor 43, an exhaust gas temperature TEXH [K] detected by the temperature sensor 45, an internal inert gas ratio MRESFR [%], a cooling water temperature TWK [K] detected by the temperature sensor 37, a target equivalence ratio TFBYA, an engine rotation speed NRPM [rpm] detected by the crank angle sensor, and an ignition dead time DEADTIME [μsec] are read.

The crank angle sensor is constituted by a position sensor 33 which detects the position of the crankshaft 7, and a phase sensor 34 which detects the position of the intake camshaft 25. The engine rotation speed NRPM [rpm] is calculated on the basis of signals from these two sensors 33, 34.

The intake valve closing timing IVC may be learned from the command value provided to the intake VTC mechanism 27. Alternatively, the actual intake valve closing timing may be detected by the phase sensor 34.

The internal inert gas ratio MRESFR is a value obtained by dividing the amount of inert gas remaining in the combustion chamber by the total gas amount in the combustion chamber. A method disclosed in JP2001-221105A, published by the Japan Patent Office in 2001, may be used as the calculation method therefore. The ignition dead time DEADTIME is a fixed value.

The target equivalence ratio TFBYA is calculated in a fuel injection amount calculation flow not shown in the drawings. The target equivalence ratio TFBYA is an absolute number, and assuming that the stoichiometric air-fuel ratio is 14.7, is expressed by the following equation (1).

$$TFBYA = 14.7/tR \qquad (1)$$

where tR: the target air-fuel ratio.

For example, when the target air-fuel ratio tR is the stoichiometric air-fuel ratio, TFBYA is 1.0, and when the target air-fuel ratio tR is a value on the lean side, for example 22.0, TFBYA is a positive value of less than 1.0.

In a step S12, a volume of the combustion chamber 5 at the intake valve closing timing IVC (that is, the volume at the compression start timing) VIVC [m³] is calculated. The volume VIVC of the combustion chamber 5 at the intake valve closing timing is determined by the stroke position of the piston 6. The stroke position of the piston 6 is determined by the crank angle position of the engine.

Figure 6:
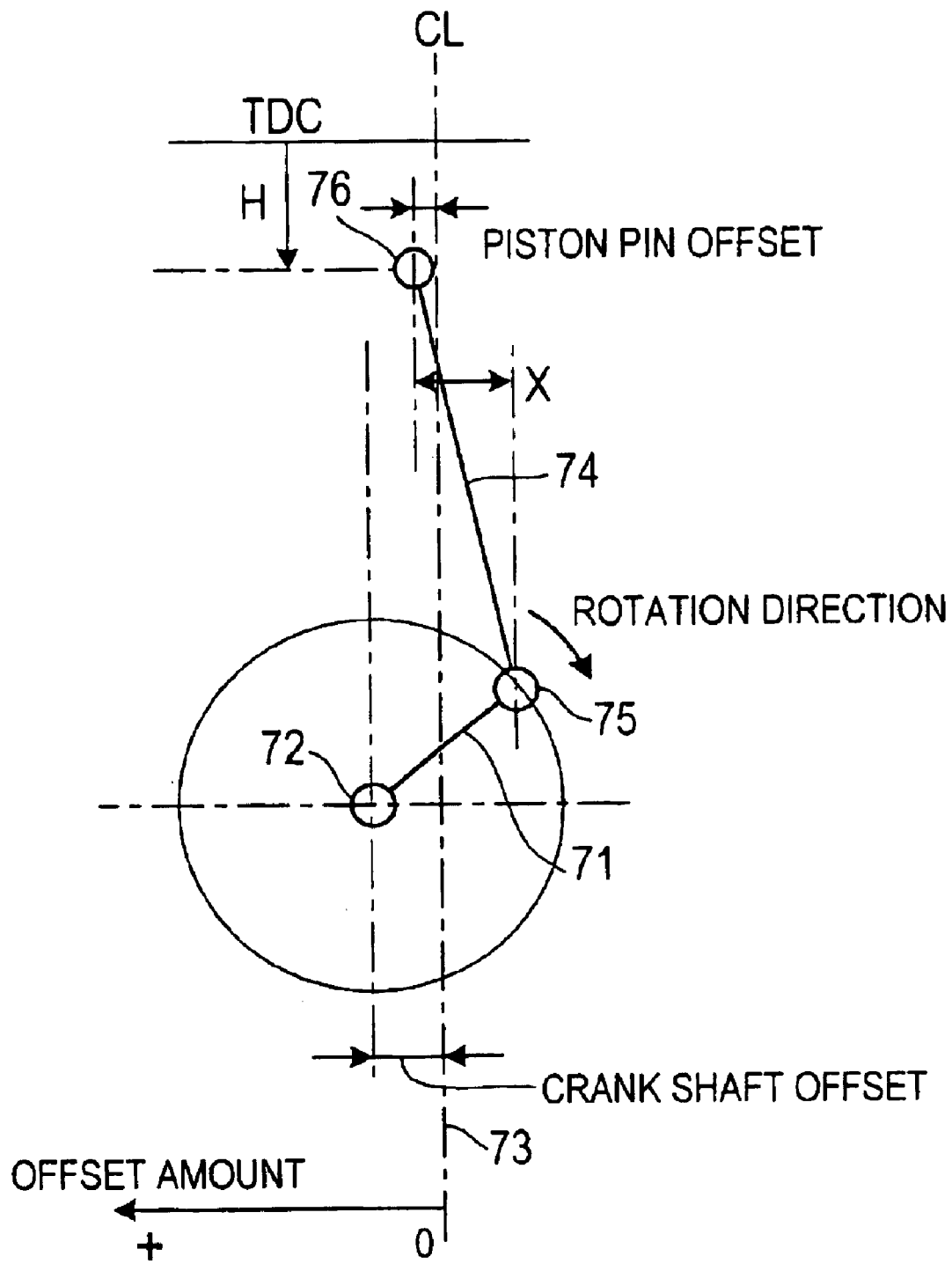
FIG. 6 is a diagram illustrating the positional relationship between a crankshaft and a connecting rod of the engine.

Referring to FIG. 6, a case in which a rotational center 72 of the engine crankshaft 71 is offset from a central axis 73 of the cylinder will be considered. A connecting rod 74, a node 75 connecting the connecting rod 74 and the crankshaft 71, and a piston pin 76 connecting the connecting rod 74 and the piston relate to each other as shown in the figure. The volume VIVC at this time of the combustion chamber 5 at the intake valve closing timing can be expressed by the following equations (2) through (6).

$$VIVC = f1(\theta ivc) \qquad (2)$$
$$= Vc + (\pi/4) \cdot D^2 \cdot H$$

$$Vc = (\pi/4) \cdot D^2 \cdot H/(\epsilon \cdot 1) \qquad (3)$$

$$H = \{(CND + ST^2/2) - (CRoff - PISoff)^2\}^{1/2} - \{(ST/2) \cdot \cos(\theta ivc + \theta off)\} + (CND^2 - X^2)^{1/2} \qquad (4)$$

$$X = (ST/2) \cdot \sin(\theta ivc + \theta off) - CRoff + PISoff \qquad (5)$$

$$\theta off = \arcsin\{(CRoff - PISoff)/(CND \cdot (ST/2))\} \qquad (6)$$

where
Vc: the gap volume [m³],
ε: the compression ratio,
D: the diameter of the cylinder bore [m],
ST: the entire stroke length of the piston [m],
H: the distance from TDC of the piston pin 76 [m],
CND: the length of the connecting rod 74 [m],
CRoff: the offset distance of the node 75 from the cylinder central axis 73 [m],
PISoff: the offset distance of the crankshaft rotational center 72 from the cylinder central axis 73 [m],
θivc: the crank angle at the intake valve closing [deg ATDC],
θoff: the angle subtended by the line joining the piston pin 76 and the crankshaft rotational center 72 at TDC and a vertical line [deg], and
X: the horizontal distance between the node 75 and the piston pin 76 [m].

As described above, the crank angle θvc at the intake valve closing timing is determined by a command signal from the engine controller 31 to the intake VTC mechanism 27, and can therefore be learned from the command signal. If the crank angle θivc (=IVC) at this time is substituted into the equations (2) through (6), the volume VIVC of the combustion chamber 5 at the intake valve closing timing cain be calculated. Accordingly, as concerns practical usage, a value set in a table having as a parameter the intake valve closing timing IVC is used as the volume VIVC of the combustion chamber 5 at the intake valve closing timing. When the intake VTC mechanism 27 is not provided, the intake valve closing timing IVC may be provided as a constant.

In a step S13, a temperature of the combustion chamber 5 at the intake valve closing timing IVC (that is, the temperature at the compression start timing) TINI [K] is calculated. The temperature TINI of the combustion chamber 5 at the intake valve closing timing IVC is the temperature of the gas produced in the combustion chamber 5 by the mixing of fresh air introduced into the combustion chamber 5 and the inert gas remaining in the combustion chamber 5. The temperature of the fresh air introduced into the combustion chamber 5 is equal to a fresh air temperature TCOL inside the intake air collector 2. The temperature of the inert gas remaining inside the combustion chamber 5 may be approximated from the exhaust gas temperature TEXH in the vicinity of the exhaust port portion. Hence TINI may be determined from the fresh air temperature TCOL inside the intake air collector 2, the exhaust gas temperature TEXH, and the internal inert gas ratio MRESFR, which is the proportion of inert gas remaining inside the combustion chamber 5, according to the following equation (7).

$$TINI=TEXH \times MRESFR+TCOL \times (1-MRESFR) \qquad (7)$$

In a step S14, a reaction probability RPROBA [%] which expresses the combustibility of the air-fuel mixture inside the combustion chamber 5 is calculated. The reaction probability RPROBA is a non-dimensional value dependent on three parameters, namely the residual inert gas ratio MRESFR, the cooling water temperature TWK [K], and the target equivalence ratio TFBYA, and hence can be expressed by the following equation (8).

$$RPROBA=f3(MRESFR, TWK, TFBYA) \qquad (8)$$

To explain more specifically, a maximum value of the reaction probability obtained by combining the three parameters MRESFR, TWK, and TFBYA is set at 100%, the relationship between these parameters and the reaction probability RPROBA is determined experientially, and the determined reaction probability RPROBA is stored in advance in the memory of the engine controller 31 as tables corresponding to these parameters. In the step S14, the reaction probability RPROBA is determined by retrieving the table in accordance with the parameter.

Figure 7:
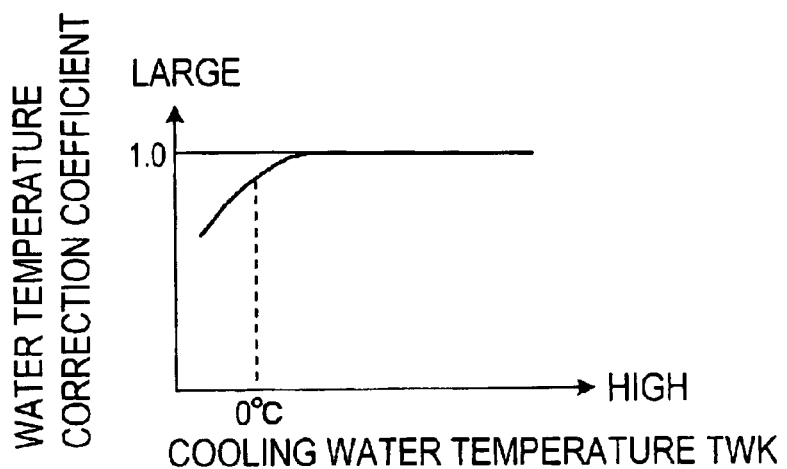
FIG. 7 is a characteristic diagram of a water temperature correction coefficient
Figure 8:
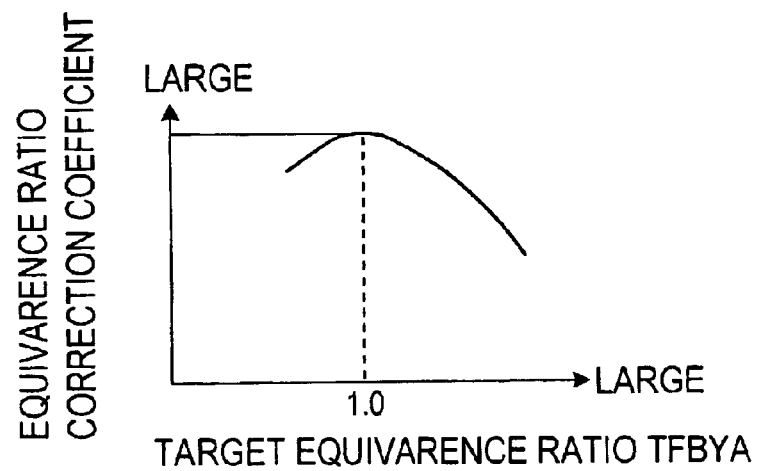
FIG. 8 is a characteristic diagram of an equivalence ratio correction coefficient

More specifically, a water temperature correction coefficient table corresponding to the cooling water temperature TWK and having a characteristic as shown in FIG. 7, an interior inert gas ratio correction coefficient table (not shown in the drawings) which is set in a similar manner, and an equivalence ratio correction coefficient table corresponding to the target equivalence ratio TFBYA and having a characteristic as shown in FIG. 8, are stored in the memory in advance. The maximum value of each correction coefficient is 1.0. The reaction probability RPROBA is calculated by multiplying the maximum reaction probability value of a hundred percent by the product of the three correction coefficients.

To describe each table, the water temperature correction coefficient shown in FIG. 7 increases as the cooling water temperature TWK rises, and reaches 1.0 when the cooling water temperature TWK is eighty degrees centigrade or greater. The equivalence ratio correction coefficient shown in FIG. 8 reaches the maximum value of 1.0 when the target equivalence ratio TFBYA is 1.0, or in other words at the stoichiometric air-fuel ratio, and the equivalence ratio correction coefficient decreases when the target equivalence ratio is either greater or less than 1.0. The internal inert gas ratio correction coefficient is not shown in the drawings, but reaches 1.0 when the internal inert gas ratio MRESFR is zero.

In a step S15, the reference crank angle θPMAX [deg ATDC] is calculated. As noted above, the reference crank angle θPMAX rarely fluctuates, but nevertheless has a tendency to advance in accordance with an increase in the engine rotation speed NRPM. The reference crank angle θPMAX may be expressed as a function of the engine rotation speed NRPM according to the following equation (9).

$$\theta PMAX=f4(NRPM) \qquad (9)$$

Figure 9:
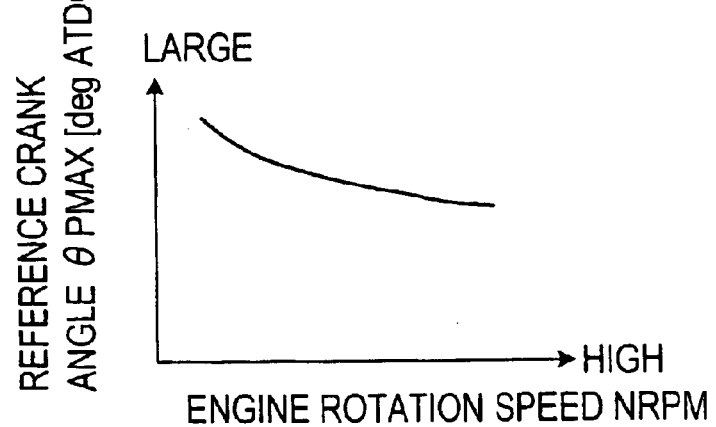
FIG. 9 is a characteristic diagram of a reference crank angle.

Specifically, the reference crank angle θPMAX is determined on the basis of the engine rotation speed NRPM by retrieving a table having the characteristic shown in FIG. 9, which is stored in the memory of the engine controller 31 in advance. For ease of calculation, the reference crank angle θPMAX may be considered constant.

Finally, in a step S16, the crank angle IGNDEAD [deg] corresponding to ignition dead time is calculated. The crank angle IGNDEAD corresponding to ignition dead time corresponds to the crank angle interval from the timing of the signal output from the engine controller 31 to block the primary current to the ignition coil 13 to the point at which the spark plug 14 actually ignites, and may be expressed by the following equation (10).

$$IGNDEAD=f5(DEADTIME, NRPM) \qquad (10)$$

Here, the ignition dead time DEADTIME is set at 200 μsec. The equation (10) is for calculating the crank angle IGNDEAD corresponding to ignition dead time, which is the crank angle which corresponds to the ignition dead time DEADTIME, from the engine rotation speed NRPM.

Figure 10:
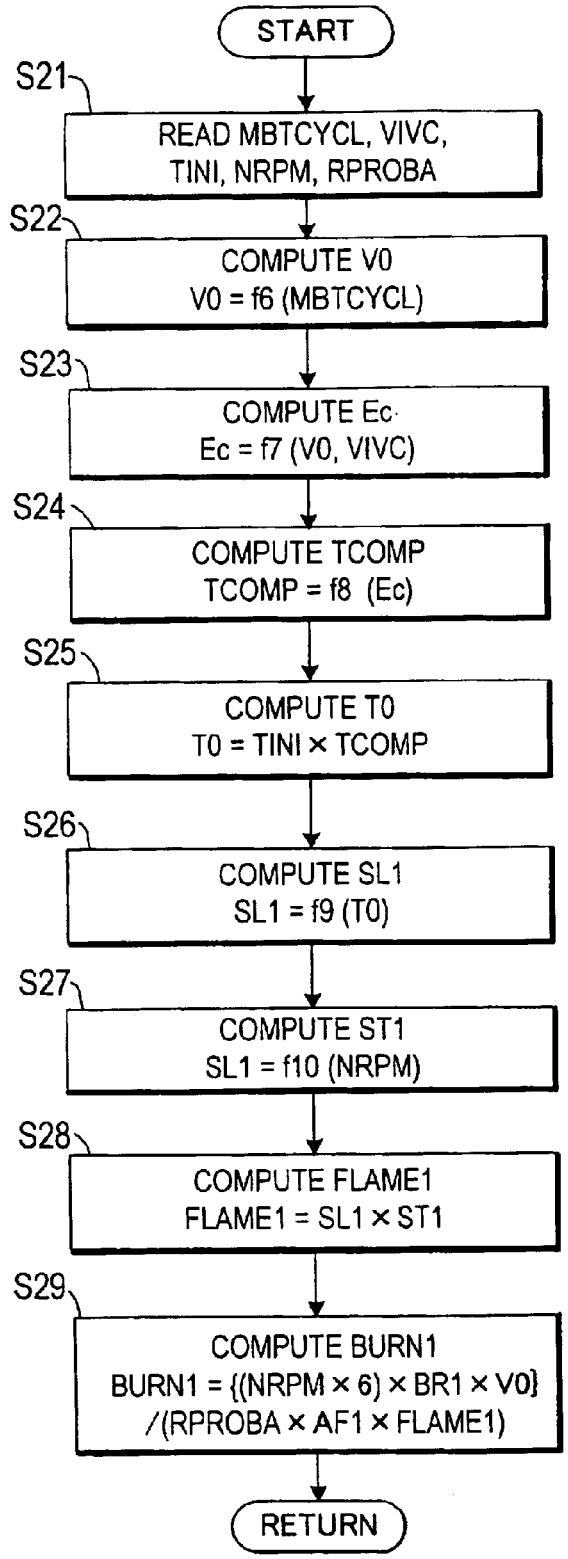
FIG. 10 is a flowchart for illustrating calculation of an initial combustion period.
Figure 12:
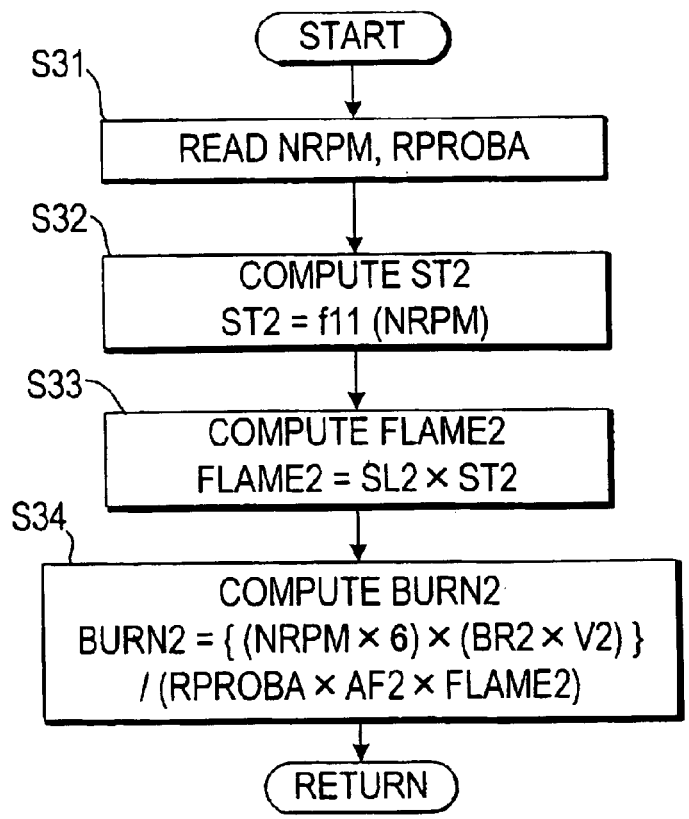
FIG. 12 is a flowchart for illustrating calculation of a main combustion period.

FIG. 10 shows a flow for calculating the initial combustion period BURN1 [deg], and FIG. 12 shows a flow for calculating the main combustion period BURN2 [deg]. These flows are executed at fixed time intervals (for example, every 10 msec). FIGS. 10 and 12 are executed following FIG. 5. Either FIG. 10 or FIG. 12 may be executed first.

First, to describe FIG. 10, in a step S21, the previous combustion start timing MBTCYCL [deg BTDC], the volume VIVC [m³] of the combustion chamber 5 at the intake valve closing timing, which was calculated in the step S12 of FIG. 5, the temperature TINI [K] of the combustion chamber 5 at the intake valve closing timing calculated in the step S13 of FIG. 5, the engine rotation speed NRPM [rpm], and the reaction probability RPROBA [%] calculated in the step S14 of FIG. 5 are read.

The previous combustion start timing MBTCYCL is the value of the basic ignition timing MBTCAL [deg BTDC] in the previous cycle, and calculation thereof will be described below.

In a step S22, a volume V0 [m³] of the combustion chamber 5 at the combustion start timing is calculated. As described above, the ignition timing (combustion start timing) here is not the basic ignition timing MBTCAL calculated in this cycle, but the value of the basic ignition timing in the previous cycle. In other words, the volume V0 of the combustion chamber 5 at the combustion start timing is calculated from MBTCYCL, which is the value of the basic ignition timing in the previous cycle, according to the following equation (11).

$$V0 = f6(MBTCYCL) \quad (11)$$

More specifically, the volume V0 of the combustion chamber 5 at MBTCYCL is calculated from the stroke position of the piston 6 at the previous combustion start timing MBTCYCL and the bore diameter of the combustion chamber 5. The volume VIVC of the combustion chamber 5 at the intake valve closing timing IVC was determined in the step S12 in FIG. 5 by retrieving a table of the volume at the intake valve closing timing having the intake valve closing timing as a parameter, but here, the volume V0 of the combustion chamber 5 at the previous combustion start timing MBTCYCL may be determined by retrieving a table of the volume at the previous combustion start timing having MBTCYCL as a parameter.

In a step S23, an effective compression ratio Ec at the combustion start timing is calculated. The effective compression ratio Ec is a non-dimensional value obtained by dividing the volume V0 of the combustion chamber 5 at the combustion start timing by the volume VIVC of the combustion chamber 5 at the intake valve closing timing, as shown in the following equation (12).

$$Ec = f7(V0, VIVC) = V0/VIVC \quad (12)$$

In a step S24, a temperature increase rate TCOMP inside the combustion chamber 5 from the intake valve closing timing IVC to the combustion start timing is calculated on the basis of the effective compression ratio Ec as shown in the following equation (13).

$$TCOMP = f8(Ec) = Ec^{\kappa-1} \quad (13)$$

where κ: the specific heat ratio.

The equation (13) expresses the temperature increase rate of the adiabatically compressed gas.

The symbol κ is a value obtained by dividing the specific heat at a constant pressure of the adiabatically compressed gas by the specific heat at a constant volume. If the adiabatically compressed gas is air, then κ=1.4, and this value may be used straightforwardly. However, by determining the value of κ in relation to air-fuel mixture experientially, a further improvement in calculation precision is possible.

Figure 11:
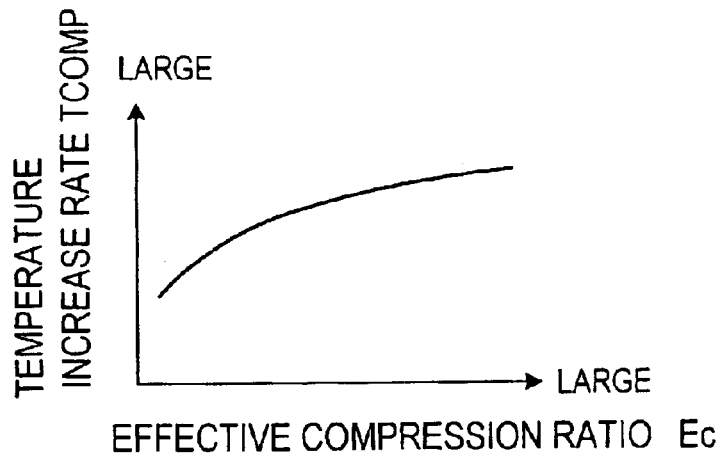
FIG. 11 is a characteristic diagram of a temperature increase rate.

FIG. 11 shows the equation (13) in the form of a diagram. A table having such a characteristic may be stored in advance in the memory of the engine controller 31, and the temperature increase rate TCOMP may be determined by retrieving this table on the basis of the effective compression ratio Ec.

In a step S25, a temperature T0 [K] of the combustion chamber 5 at the combustion start timing is calculated by multiplying the temperature increase rate TCOMP by the temperature TINI of the combustion chamber 5 at the intake valve closing timing, or in other words according to the following equation (14).

$$T0 = TINI \times TCOMP \quad (14)$$

In a step S26, a laminar flow combustion speed SL1 [m/sec] is calculated according to the following equation (15).

$$SL1 = SLstd \times (T0 \times Tstd)^{2.18} \times (P0/Pstd)^{-0.16} \quad (15)$$

where
Tsid: the reference temperature [K],
Pstd: the reference pressure [Pa],
SLstd: the reference laminar flow combustion speed [m/sec] at the reference temperature Tsid and reference pressure Pstd,
T0: the temperature [K] of the combustion chamber 5 at the combustion start timing, and
P0: the pressure [Pa] of the combustion chamber 5 at the combustion start timing.

The reference temperature Tstd, reference pressure Ptsd, and reference laminar flow combustion speed SLstd are values which are determined in advance experientially.

Under pressure which is equal to or greater than the normal pressure in the combustion chamber 5 of two bars, the pressure term $(P0/Pstd)^{-0.16}$ in the equation (15) becomes a small value. The reference laminar flow combustion speed SLstd may therefore be defined only by the reference temperature Tstd with the pressure term $(P0/Pstod)^{-0.16}$ as a constant value.

Accordingly, the relationship of the temperature T0 at the combustion start timing when the reference temperature Tstd is 550 [K], the reference laminar flow combustion speed SLstd is 1.0 [m/sec], and the pressure term is 0.7 with the laminar flow combustion speed SL1 can be approximately defined by the following equation (16).

$$SL1 = f9(T0) \quad (16)$$
$$= 1.0 \times 0.7 \times (T0/550)^{2.18}$$

In a step S27, a gas flow turbulence intensity ST1 during initial combustion is calculated. The gas flow turbulence intensity ST1 is a non-dimensional value dependent on the flow rate of the fresh air which flows into the combustion chamber 5 and the penetration of the fuel injected by the fuel injector 21.

The flow rate of the fresh air which flows into the combustion chamber 5 is dependent on the form of the intake passage, the operating state of the intake valve 15, and the form of the intake port 4 in which the intake valve 15 is provided. The penetration of the injected fuel is dependent on the injection pressure of the fuel injector 21, the fuel injection period, and the fuel injection timing.

Ultimately, the gas flow turbulence intensity ST1 during initial combustion may be expressed as a function of the engine rotation speed NRPM by the following equation (17).

$$ST1 = f10(NRPM) = C1 \times NRPM \qquad (17)$$

where C1: a constant.

The turbulence intensity ST1 may also be determined from a table having the rotation speed NRPM as a parameter.

In a step S28, a gas combustion speed FLAME1 [m/sec] during initial combustion is calculated from the laminar flow combustion speed S1 and the turbulence intensity ST1 according to the following equation (18).

$$FLAME1 = SL1 \times ST1 \qquad (18)$$

When gas turbulence is present inside the combustion chamber 5, the gas combustion speed varies. The equation (18) takes into consideration the contribution to (effect on) the combustion speed of this gas turbulence.

In a step S29, the initial combustion period BURN1 [deg] is calculated according to the following equation (19).

$$BURN1 = \{(NRPM \times 6) \times (BR1 \times V0)\} / (PRROBA \times AF1 \times FLAME1) \qquad (19)$$

where AF1: the reaction area of the flame kernel (a fixed value) [m²].

The term BR1 on the right side of the equation (19) is the amount of change in the combustion mass proportion from the combustion start timing to the end timing of the initial combustion period BURN1, and here is set to BR1=2%. The (NRPM×6) item on the right side of the equation (19) is a measure taken to switch the unit of measurement from rpm to crank angle degrees. The reaction area AF1 of the flame kernel is set by way of experiment.

Moving to the flow in FIG. 12, the rotation speed NRPM, and the reaction probability RPROBA calculated in the step S14 of FIG. 5, are read in a step S31.

In a step S32, a gas flow turbulence intensity ST2 during main combustion is calculated. Similarly to the gas flow turbulence intensity ST1 during initial combustion, the gas flow turbulence intensity ST2 may be expressed as a as a function of the engine rotation speed NRPM by the following equation (20).

$$ST2 = f11(NRPM) = C2 \times NRPM \qquad (20)$$

where C2: a constant.

The turbulence intensity ST2 may also be determined from a table having rotation speed as a parameter.

In a step S33, a combustion speed FLAME2 [m/sec] during main combustion is calculated from the laminar flow combustion speed SL2 [m/sec] and gas flow turbulence intensity ST2 during main combustion according to the following equation (21).

$$FLAME2 = SL2 \times ST2 \qquad (21)$$

where SL2: the laminar flow combustion speed [m/sec].

Similarly to the equation (18), the equation (21) takes into consideration the contribution of gas turbulence to the combustion speed.

As noted above, the length of the main combustion period BURN2 is unlikely to be affected by variation in the temperature and pressure inside the combustion chamber 5. Hence a fixed value determined in advance experientially is applied to the laminar flow combustion speed SL2.

In a step S34, the main combustion period BURN2 [deg] is calculated by the following equation (22) which is similar to the equation (19).

$$BURN2 = \{(NRPM \times 6) \times (BR2 \times V2)\} / (PRROBA \times AF2 \times FLAME2) \qquad (22)$$

where

V2: the volume [m³] of the combustion chamber 5 at the start of the main combustion period, and AF2: the reaction area of the flame kernel [m²].

Here, the term BR2 on the right side of the equation (22) is the amount of change in the combustion mass proportion from the start timing to the end timing of the main combustion period. At the end timing of the initial combustion period, the combustion mass proportion is at two percent, whereupon the main combustion period begins. The main combustion period is considered complete when the combustion mass proportion reaches sixty percent, and hence BR2 is set to equal 60%−2%=58%. AF2 is the average reaction area of the flame kernel during the growth process of the flame kernel, and similarly to AF1 in the equation (19), is set as a fixed value which is determined in advance through experiment. The volume V2 of the combustion chamber 5 at the start of the main combustion period is also a fixed value.

Figure 13:
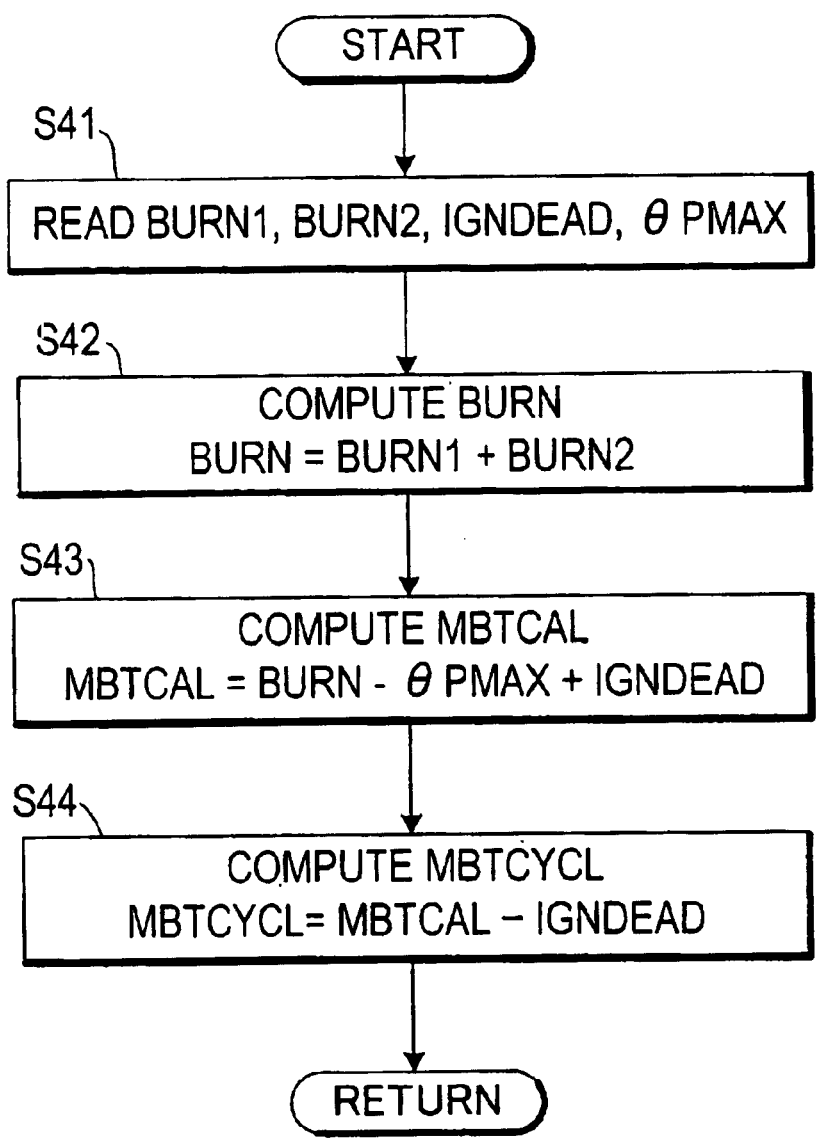
FIG. 13 is a flowchart for illustrating calculation of a basic ignition timing.

FIG. 13 is a flow for calculating the basic ignition timing MBTCAL [deg BTDC], and is executed at fixed time intervals (for example, every 10 msec). The flow of FIG. 13 is executed following the latterly executed flow from among FIGS. 10 and 12.

In a step S41, the initial combustion period BURN1 calculated in the step S29 in FIG. 10, the main combustion period BURN2 calculated in the step S34 in FIG. 12, the crank angle IGNDEAD corresponding to ignition dead time calculated in the step S16 in FIG. 5, and the reference crank angle θPMAX calculated in the step S15 in FIG. 5 are read.

In a step S42, the sum total of the initial combustion period BURN1 and the main combustion period BURN2 is calculated as the combustion period BURN [deg].

In a step S43, the basic ignition timing MBTCAL [deg BTDC] is calculated according to the following equation (23).

$$MBTCAL = BURN - \theta PMAX + IGNDEAD \qquad (23)$$

In a step S44, a value obtained by subtracting the crank angle IGNDEAD corresponding to ignition dead time from the previous basic ignition timing MBTCAL is calculated as the previous combustion start timing MBTCYCL [deg BTDC]. The calculated basic ignition timing MBTCAL is compared to a knock limit ignition timing to be described below, and the smallest value thereof (the value furthest toward the retardation side) is selected as the minimum ignition timing value PADV [deg BTDC]. Various corrections such as retardation in order to raise the early exhaust temperature and retardation in order to reduce torque during a speed change are applied to the minimum ignition timing value PADV, and thus the ignition timing command value QADV [deg BTDC] is calculated. The ignition timing command value QADV is moved to an ignition register, and when the actual crank angle matches the ignition timing command value QADV, an ignition signal blocking the primary current is outputted from the engine controller 31 to the ignition coil 13.

Assuming that the basic ignition timing MBTCAL calculated in the step S43 is used as the ignition timing command value of this cycle, the previous combustion start timing MBTCYCL calculated in the step S44 is used in the step S22 of FIG. 10 until the ignition timing of the next cycle.

As described above, in this embodiment the basic ignition timing MBTCAL, which is an ignition timing for obtaining MBT, is calculated without performing mass calculations of the mass of unburned gas inside the combustion chamber 5 or the like, and hence the calculation load can be suppressed to a low level.

Further, as illustrated in the equation (19) above, the initial combustion period BURN1 is expressed as a function of the combustion chamber volume V0 at the combustion start timing, the reaction probability RPROBA which expresses the likelihood of air-fuel mixture combustion, and the combustion speed FLAME1. Here, the initial combustion period BURN1 lengthens as the combustion chamber volume V0 at the combustion start timing increases, the reaction probability RPROBA decreases, and the combustion speed FLAME1 decreases, as a result of which the basic ignition timing MBTCAL advances.

Similarly, as illustrated in the equation (22) above, the main combustion period BURN2 is expressed as a function of the combustion chamber volume V2 at the main combustion period start timing, the reaction probability RPROBA expressing the likelihood of air-fuel mixture combustion, and the combustion speed FLAME2. The main combustion period BURN2 lengthens as the combustion chamber volume V2 at the main combustion period start timing increases, the reaction probability RPROBA decreases, and the combustion speed FLAME2 decreases, as a result of which the ignition timing MBTCAL advances.

By calculating the combustion periods BURN1 and BURN2 as functions of various parameters affecting the combustion period, the combustion periods BURN1 and BURN2 can be calculated accurately. As a result, the basic ignition timing MBTCAL, which is calculated on the basis of the combustion periods BURN1 and BURN2, can also be calculated with a high degree of precision. Further, by calculating the combustion period BURN divided into the initial combustion period BURN1, which corresponds to the growth period of the flame kernel during which temperature and pressure are high and likely to affect the length of the period, and the main combustion period, during which temperature and pressure have little effect, the calculation accuracy of the combustion period BURN improves. Calculation accuracy may be improved even further by dividing the combustion period BURN into three or more periods.

It should be noted that here, the combustion speed FLAME1 used to calculate the initial combustion period BURN1 is calculated as the product of the laminar flow combustion speed SL1 and the turbulence intensity ST1, and the combustion speed FLAME2 used to calculate the main combustion period BURN2 is calculated as the product of the laminar flow combustion speed SL2 and the turbulence intensity ST2. However, as described in the aforementioned JP10-30535A, the combustion speeds FLAME1 and FLAME2 may be determined using an addition method. Further, the initial combustion period is defined as a combustion mass proportion of zero to two percent (in other words, BR1=2%), and the main combustion period is defined as a combustion mass proportion of two percent to sixty percent (in other words, BR2=58%), but this invention is not necessarily limited to these numerical values.

Next, the flow of ignition timing control executed using the basic ignition timing MBTCAL described above will be described with reference to FIGS. 14 to 16. During this control process, calculation of a knocking index value (MBTKM) which is a feature of this invention, and calculation of the knocking limit ignition timing (KNKCAL) to which the knocking index value MBTKN is applied, are performed.

Figure 14:
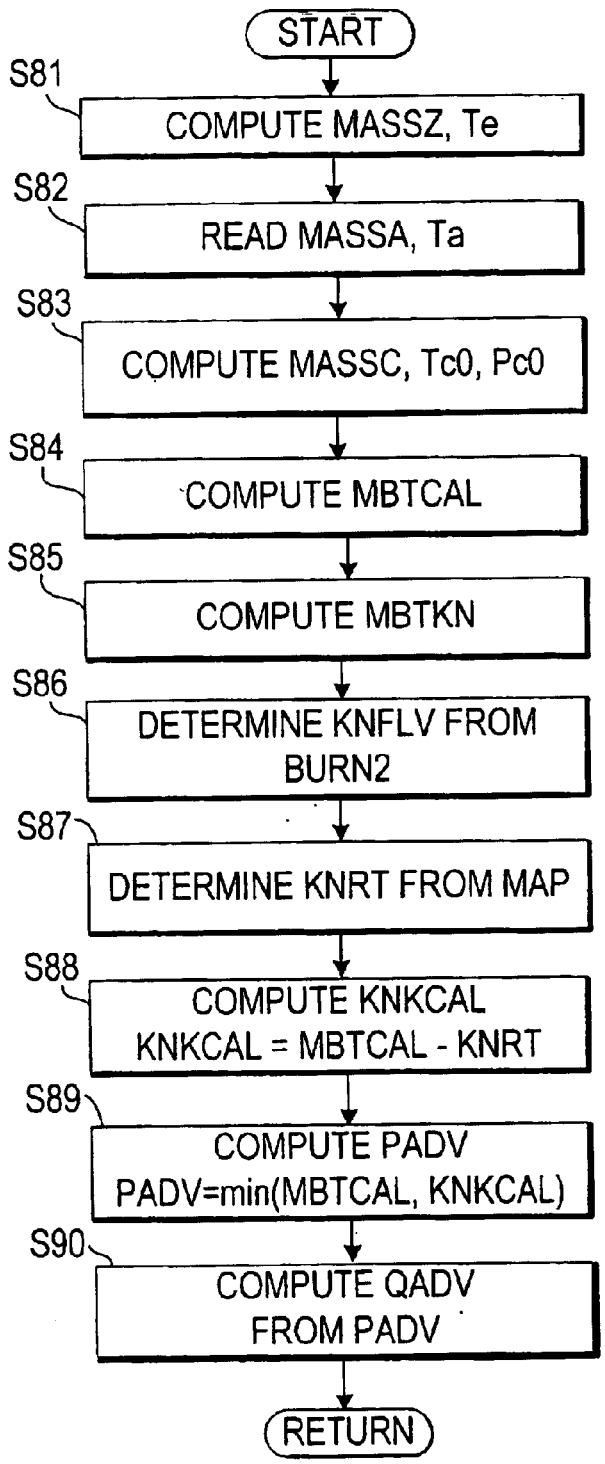
FIG. 14 is a flowchart illustrating a processing sequence of ignition timing control to which this invention is applied.

Referring to FIG. 14, first, in a step S81, a mass MASSZ and temperature Te of residual gas remaining inside the cylinder without being discharged are calculated. The residual gas mass MASSZ may be determined by adding the mass of the residual gas in the combustion chamber and the mass of the exhaust gas that has flowed back into the intake system from the exhaust system during overlap of the intake and exhaust valves. The temperature Te may be determined approximately using a table based on the intake air amount and the like. The method disclosed in the aforementioned JP2001-221105A may be used as a calculation method for the residual gas mass MASSZ and temperature Te.

Next, in a step S82, a mass MASSA and temperature Ta of fresh air are read from the respective output results of the air-flow meter 32 and intake air temperature sensor 43 (see FIG. 1).

Next, in a step S83, MASSA, Te, MASSZ, and Ta are used in the following equations (24) and (25) to respectively determine an air-fuel mixture mass MASSC and an air-fuel mixture temperature Tc0 [K] at the compression start time (IVT: intake valve closing time).

$$MASSC = MASSA + MASSZ \qquad (24)$$

$$Tc0 = (MASSA \times Ta + MASSZ \times Te)/(MASSA + MASSZ) \qquad (25)$$

A pressure Pc0 at the compression start time is also determined from the output result of the intake air pressure sensor 44 (see FIG. 1). A value estimated from the intake air amount and rotation speed may also be used as the pressure Pc0.

Next, in a step S84, the basic ignition timing MBTCAL at which MBT (the minimum advance value for obtaining maximum torque) is obtained is determined by the method described above. Note that in this embodiment, the main combustion period BURN2, determined in the calculation process for MBTCAL (FIG. 12), is used in the following calculations as a representative value of the combustion speed.

From a step S85 onward, processing for calculating the knock limit ignition timing KNKCAL is performed. First, in the step S85, the knocking index value MBTKN is determined. The knocking index value MBTKN is a momentary auto-ignition period (msec) from a crank angle indicating a maximum combustion pressure value at MBT to the vicinity of a crank angle indicating a maximum temperature value. Here, an example in which the crank angle indicating the maximum pressure value (reference crank angle) is set at 13 deg ATDC (to be expressed as θPMAX=13 degrees below) will be described with reference to the time charts in FIG. 17. Note that as described above, θPMAX is within a normal range of twelve to fifteen deg ATDC and within a maximum range of ten to twenty deg ATDC depending on the engine characteristics.

First, an average temperature Tc [K] and pressure (reference in-cylinder pressure) Pc [ata] at θPMAX=13 degrees are determined according to the following equations (26) and (27) respectively.

$$Tc = Tc0 \times \epsilon^{pt-1} + TUP\# \times Q/MASSC \qquad (26)$$

$$Pc = Pc0 \times \epsilon^{pt} \cdot (Tc + TUP\# \times Q/MASSC)/Tc \times VUP\# \qquad (27)$$

where $\epsilon$: the compression ratio,

Q: the amount of heat generated by combustion,

TUP#: the temperature increase coefficient, pt: the politropic index =1.35, and

VUP#: the rate of change in the gas volume.

The compression ratio $\epsilon$ is the ratio of the volume at the intake valve closing timing (IVC) to the volume at θPMAX=

13 degrees. In an engine comprising a variable intake valve mechanism capable of controlling the open/close timing of the intake valve, the compression ratio $\epsilon$ may be determined from the control value thereof, and if the open/close timing is fixed, the compression ratio $\epsilon$ may be set as a known constant. In order to further improve precision, an effective IVC=IVC where the substantial intake air amount is determined may be used, but since this moves in the direction of crank angle advance according to the rotation speed, a method of determining $\epsilon$ from the rotation speed may also be used.

The amount of heat generated during combustion Q is the amount of heat generated by combustion of the air-fuel mixture when the combustion proportion at $\theta$PMAX=13 degrees is set at sixty percent.

The temperature increase coefficient TUP# is a coefficient applied to a calculation performed when the amount of heat generated during combustion Q heats air-fuel mixture in an amount equal to MASSC. It goes without saying that specific heat is included in TUP#.

The rate of change of the gas volume VUP# is the rate of change of the gas volume according to changes in molecular mass when sixty percent of the mixture of gasoline and air has burned and turned into gas during the combustion process. More specifically, a value which is slightly larger than 1 (for example, approximately 1.03) may be applied to the gas volume rate of change VUP#.

A temperature T [K] of unburned gas that is compressed by the rise of the piston and temperature increase and expansion of the burned gas is then determined according to the following equation (28).

$$T = Tc0 \times \epsilon^{pt-1} \cdot (TC/Tc0 \times \epsilon^{pt-1})^{pt-1} \quad (28)$$

Finally, the pressure Pc and unburned gas temperature T at $\theta$PMAX=13 degrees, determined in the manner described above, are used in the following equation (29) to determined the knocking index value MBTKN [msec].

$$MBTKN = OCT \times Pc^{-1.7} \times \exp(3800/T) \quad (29)$$

The term OCT in the equation is a coefficient determined by the octane value of the fuel, and uses a value of approximately 15 with high-octane gasoline (premium gasoline) and approximately 10 with regular gasoline, for example. This equation is for determining the auto-ignition period of the elementary reaction.

The knocking index value MBTKN expresses the auto-ignition period, and when this period elapses, auto-ignition, or in other words knocking, is generated. Hence a relationship in which knocking becomes more likely to be generated as MBTKN decreases is established. However, since the temperature and pressure inside the combustion chamber are ever-changing rather than constant, MBTKN is determined to correspond to the minimum auto-ignition period value in a cycle.

Figure 15:
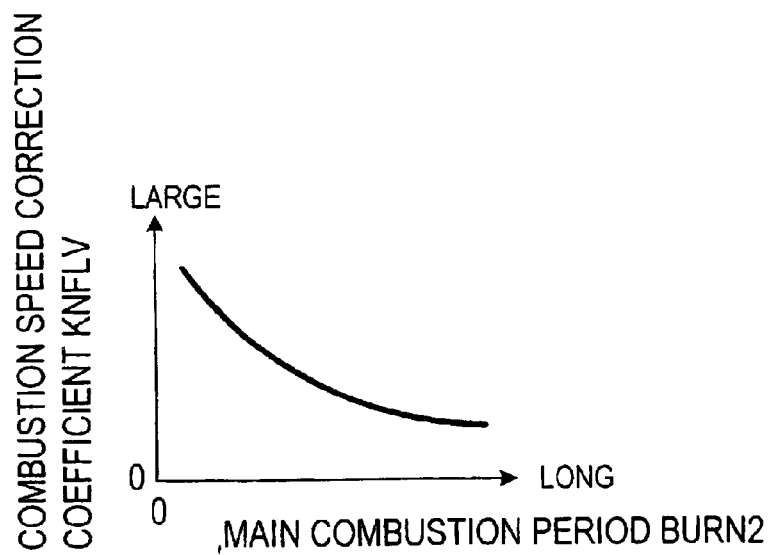
FIG. 15 is a characteristic diagram of a knocking index value.

In a step S86, a combustion speed correction coefficient KNFLV for the knocking index value MBTKN is determined. Depending on variations in temperature and pressure, the actual auto-ignition period during the generation of knocking in an engine is strongly affected by the period during which the temperature and pressure are maintained at high levels, and hence when combustion is early, knocking is unlikely to occur, but when combustion is retarded, knocking is likely to occur. Hence in this embodiment, the main combustion period BURN2 determined during the calculation of MBT is used to determine the aforementioned correction coefficient KNFLV. An example of the characteristic of KNFLV is shown in FIG. 15. When the main combustion period BURN2 is long, or in other words when combustion is late, KNFLV takes a small value, and hence the knocking index value MBTKN has a characteristic of being corrected in a direction in which knocking becomes more likely to occur.

Figure 16:
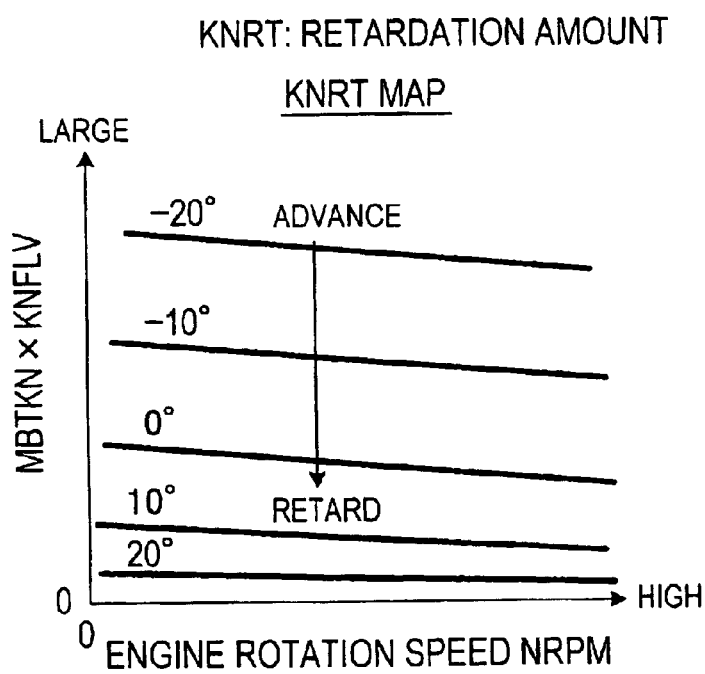
FIG. 16 is a characteristic diagram of a retardation amount with respect to an MBT (minimum advance value for obtaining maximum torque) which provides a trace knock.

Next, in a step S87, a retardation amount KNRT from the MBT ignition timing for obtaining trace knock is determined by retrieving a map which uses the aforementioned MBTKN and KNFLV. FIG. 16 shows an example of the characteristic thereof. The retardation amount KNRT is determined from a map in which the ordinate is MBTKN×KNFLV, and the abscissa is the engine rotation speed NRPM. The characteristic of this map is such that the retardation amount increases as the numerical value of the ordinate increases and the rotation speed decreases.

Next, in a step S88, the knock limit ignition timing KNKCAL is determined from the following equation (30).

$$KNKCAL = MBTCAL - KNRT \quad (30)$$

In steps S89, S90, the smaller value of MBTCAL and KNKCAL, or in other words the value on the retardation side, is selected as the minimum ignition timing value PADV, various corrections are applied thereto, and the resultant value is set as the ignition timing command value QADV that is handed over to the ignition timing control portion 61 of FIG. 2. Thereupon, the current processing ends.

Figures 17A, 17B:
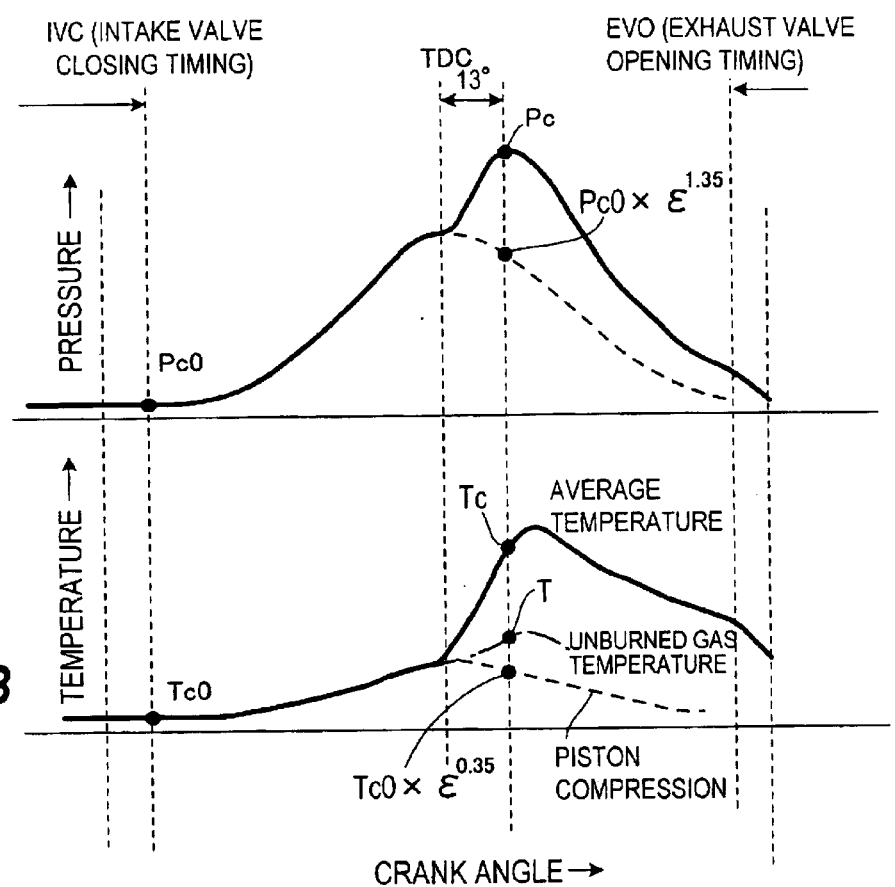
FIGS. 17A, 17B are time charts relating to the control of this embodiment.

As shown in the time chart in FIG. 17A, the in-cylinder pressure Pc is compressed by the rising of the piston, begins to rise from the value Pc0 at IVC, and is compressed until top dead center. Having passed the vicinity of top dead center, the pressure is then raised by combustion, and having passed a peak value Pc, is reduced by expansion. Similarly, as shown in the time chart in FIG. 17B, the temperature T is raised by compression from a starting point of the temperature Tc0 at IVC to top dead center, and is then raised further by combustion.

Three waveforms are shown in FIG. 17B. The broken line is a waveform illustrating the temperature variation due to piston compression, and the solid line is the average temperature inside the cylinder, which is greatly raised by combustion. The dot/dash line is the temperature T of the unburned gas, which contributes directly to the knocking of this invention. When the in-cylinder pressure P is raised by combustion, the unburned air-fuel mixture is compressed, and hence rises in temperature. Accordingly, the temperature T takes a considerably lower value than the average temperature. Further, since the unburned gas is compressed by the in-cylinder pressure, the crank angle at which the unburned gas temperature T takes a maximum value is equal to the crank angle at which the in-cylinder pressure Pc takes a maximum value.

The crank angle region between ten and twenty deg ATDC is the region in which knocking is normally most likely to occur, or in other words the timing at which the auto-ignition period shortens, and hence by calculating the temperature and pressure within this range, knocking can be predicted with greater precision.

As described above, in this invention the in-cylinder pressure and unburned gas temperature at a reference crank angle which is set at a predetermined crank position after compression top dead center is determined from the operating conditions of a spark ignition engine, whereupon the in-cylinder pressure and unburned gas temperature are used to calculate a knocking index value. By means of such calculation processing based on the operating conditions, a knocking index value, or in other words the likelihood of knocking occurrence, can be determined, and as a result the need to deal with knocking based on a large number of maps, which requires a very large number of steps, is eliminated.

In other words, by applying the knocking index value according to this invention, the number of matching processes of an ignition timing control device and the like can be reduced, and the calculation load of the control system can be lightened. It should be noted, however, that the knocking index value of this invention is not limited to ignition timing control, and may be applied widely to engine controls elements relating to the generation of knocking such as the air-fuel ratio.

The entire contents of Japanese Patent Application P2003-038018 (filed, Feb. 17, 2003) are incorporated herein by reference.

Although the invention has been described above by reference to a certain embodiment of the invention, the invention is not limited to the embodiment mentioned above. Modifications and variations of the embodiments described above will occur to those skilled in the art, in the light of the above teachings. The scope of the invention is defined with reference to the following claims.

What is claimed is:

1. A knocking index value calculation device of a spark ignition engine, comprising a controller functioning to:

determine operating conditions of the engine;

estimate an in-cylinder pressure at a reference crank angle, which is set at a predetermined crank position after compression top dead center, on the basis of the operating conditions;

estimate a temperature of unburned gas in the cylinder at the reference crank angle on the basis of the operating conditions; and calculate a knocking index value using the in-cylinder pressure and unburned gas temperature.

2. The knocking index value calculation device as defined in claim 1, wherein the reference crank angle is set to a value within a range of ten to twenty degrees after compression top dead center.

3. The knocking index value calculation device as defined in claim 1, wherein the controller further functions to:

determine as the operating conditions of the engine an in-cylinder pressure when an intake valve closes, a temperature of the unburned gas in the cylinder when the intake valve closes, and an amount of heat generated by fuel combustion; and estimate the in-cylinder pressure and unburned gas temperature at the reference crank angle on the basis of the in-cylinder pressure when the intake valve closes, the temperature of the unburned gas in the cylinder when the intake valve closes, and the amount of heat generated by fuel combustion.

4. The knocking index value calculation device as defined in claim 1, wherein the controller further functions to correct the knocking index value on the basis of a combustion speed.

5. The knocking index value calculation device as defined in claim 4, wherein the controller further functions to correct the knocking index value such that the knocking index value decreases as the combustion speed decreases.

6. The knocking index value calculation device as defined in claim 1, wherein the controller further functions to calculate, on the basis of the knocking index value, an amount of retardation of an ignition timing relating to a minimum advance value for obtaining maximum torque.

7. The knocking index value calculation device as defined in claim 6, wherein the controller further functions to increase the retardation amount of the ignition timing as the knocking index value increases.

8. A knocking index value calculation device of a spark ignition engine, comprising:

means for determining operating conditions of the engine;

means for estimating an in-cylinder pressure at a reference crank angle, which is set at a predetermined crank position after compression top dead center, on the basis of the operating conditions;

means for estimating a temperature of unburned gas in the cylinder at the reference crank angle on the basis of the operating conditions; and means for calculating a knocking index value using the in-cylinder pressure and unburned gas temperature.

9. A knocking value calculation method, comprising:

determining operating conditions of a spark ignition engine;

estimating an in-cylinder pressure at a reference crank angle, which is set at a predetermined position after compression top dead center, on the basis of the operating conditions;

calculating a temperature of unburned gas in the cylinder at the reference crank angle on the basis of the operating conditions; and calculating the knocking index value using the in-cylinder pressure and unburned gas temperature.

* * * * *